US011288380B2

(12) United States Patent
Kumar et al.

(10) Patent No.: US 11,288,380 B2
(45) Date of Patent: Mar. 29, 2022

(54) SECURELY SHARING SELECTED FIELDS IN A BLOCKCHAIN WITH RUNTIME ACCESS DETERMINATION

(71) Applicant: Oracle International Corporation, Redwood Shores, CA (US)

(72) Inventors: Dinesh Kumar, Apex, NC (US); David Joseph Haimes, Belmont, CA (US); Todd Jeffery Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 220 days.

(21) Appl. No.: 16/601,205

(22) Filed: Oct. 14, 2019

(65) Prior Publication Data

US 2021/0110049 A1    Apr. 15, 2021

(51) Int. Cl.
*G06F 21/00* (2013.01)
*G06F 21/60* (2013.01)
*H04L 9/08* (2006.01)
*G06F 16/23* (2019.01)

(52) U.S. Cl.
CPC ........ *G06F 21/602* (2013.01); *G06F 16/2365* (2019.01); *H04L 9/0822* (2013.01); *H04L 2209/38* (2013.01)

(58) Field of Classification Search
CPC ..... H04L 9/0637; H04L 9/085; H04L 9/3218; H04L 9/3236; H04L 9/3271; H04L 9/3297; H04L 2209/38; G06F 21/64
See application file for complete search history.

(56) References Cited

U.S. PATENT DOCUMENTS

| 10,805,072 | B2* | 10/2020 | Corduan | G06Q 20/385 |
| 2020/0076596 | A1* | 3/2020 | Chopart | H04L 9/0825 |
| 2020/0112572 | A1* | 4/2020 | Ajayi | H04L 63/1416 |
| 2020/0313903 | A1* | 10/2020 | Yu | H04L 9/14 |
| 2021/0004739 | A1* | 1/2021 | Gill | G06Q 10/06393 |
| 2021/0182423 | A1* | 6/2021 | Padmanabhan | G06F 21/6245 |
| 2021/0211468 | A1* | 7/2021 | Griffin | H04L 9/0637 |

* cited by examiner

*Primary Examiner* — Mahfuzur Rahman
(74) *Attorney, Agent, or Firm* — Kilpatrick Townsend & Stockton LLP

(57) ABSTRACT

A blockchain architecture allows blocks to store both public and private data. The public data may be accessible to any node in the blockchain network, while the private data may be accessible only to nodes specified in an access list, which may be provided when a record is added to the blockchain. When a new record is received, any private fields in the record may be identified and encrypted by a receiving node. The key may then be encrypted and sent with the protected record to other nodes in the access list. These nodes can access the encryption key, decrypt the private fields, and provide a consensus decision to a receiving node. After consensus, the protected record may be added to the blockchain, where the public fields may be freely accessed by any node, and the private fields remain accessible only to nodes in the access list.

17 Claims, 16 Drawing Sheets

SECURELY SHARING SELECTED FIELDS IN A BLOCKCHAIN WITH RUNTIME ACCESS DETERMINATION

BACKGROUND

A blockchain is an expandable list of individual records that are linked using cryptography. Each record in the blockchain may be stored in a "block" that includes a cryptographic hash of the previous block, a timestamp, and transaction data. The cryptographic hash in each block prevents modification of the transaction data. Instead of being stored on a single device or managed by a single system, a blockchain may be stored as a distributed structure that is managed collectively over a network. Blocks may be added to the blockchain by nodes in the network by executing a consensus mechanism that prevents modification of the blockchain without consensus from a sufficient number of nodes.

Generally, data in a blockchain may be freely accessible to nodes within the blockchain network. Because the transactional data stored in each block may be required to execute smart contracts and/or execute consensus algorithms, this information is made freely available to consensus nodes in the blockchain network that perform the consensus algorithm. This also allows sensitive information in each of the blocks may be exposed generally to nodes in the blockchain network. Furthermore, there is no current blockchain architecture that provides blocks with both public and private data where private data may be protected with a node access list provided at transaction time.

BRIEF SUMMARY

A blockchain architecture allows blocks to store both public and private data. The public data may be accessible to any node in the blockchain network, while the private data may be accessible only to nodes specified in an access list, which may be provided when a record is added to the blockchain. When a new record is received, any private fields in the record may be identified and encrypted by a receiving node. The key may then be encrypted and sent with the protected record to other nodes in the access list. These nodes can access the encryption key, decrypt the private fields, and provide a consensus decision to a receiving node. After consensus, the protected record may be added to the blockchain, where the public fields may be freely accessed by any node, and the private fields remain accessible only to nodes in the access list.

Nodes in the blockchain network may use dedicated key management services (KMSs) to store the encryption key used to access the private fields. The key used to encrypt the private fields can be reused for any records received by a particular node and shared with the same access list. The corresponding KMS can store a key-value entry that is referenced using a hash of the receiving node and the access list. The encryption key can then be shared with other nodes on the access list using public/private key cryptography. To later access a record in the blockchain with encrypted private fields, each node on the access list can store the encryption key in a key-value entry that is referenced by a hash of the record ID.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
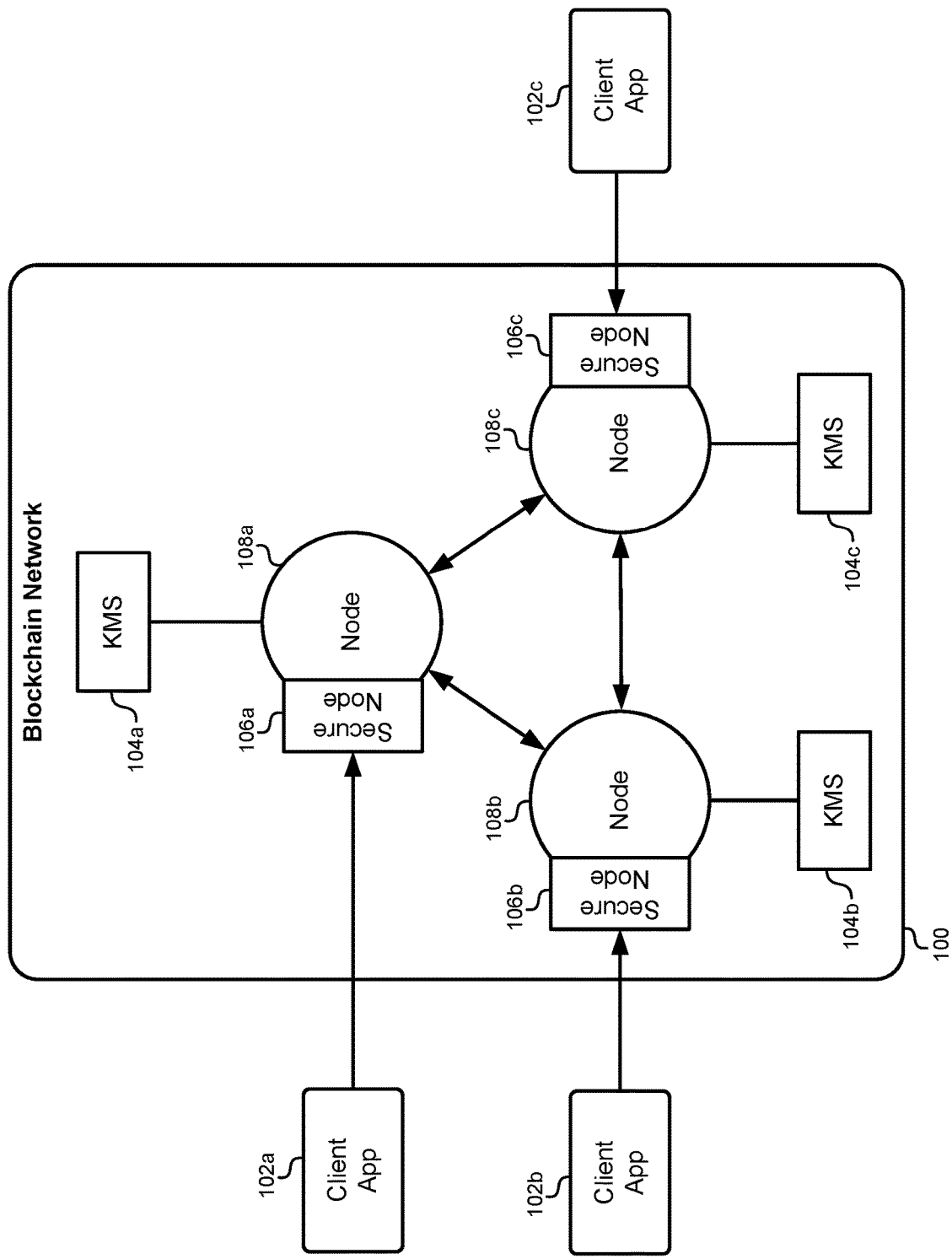
FIG. 1 illustrates an architecture diagram of a blockchain network, according to some embodiments.

Blockchain technology is rapidly being adopted in almost every industry. This is particularly true in industries where there is a need for distributed ledgers or where public transactions may benefit from a consensus mechanism for validating new records added to the blockchain. For example, blockchain is gaining popularity for enterprise applications, and enterprise-grade blockchain platforms are beginning to emerge in the marketplace. These platforms include Hyperledger Fabric (HLF), Sawtooth, RAFT, and KAFKA. This spread of blockchain technology allows developers to leverage the traditional benefits of blockchain technology in new areas. These benefits include an immutable record history, consensus on validity, cryptographic algorithms, and distributed processing.

Blockchains are generally described as being public or private. Public blockchains allow anyone to join a blockchain network. Public blockchains may also allow anyone to read, write, or participate in blockchain creation and/or validation. Public blockchains are decentralized such that no one has control over the network, and they are secure in that the data cannot be changed once validated on the blockchain. Private blockchains are permission-based networks that place restrictions on who is allowed to participate in the network and access, add, or update records in the blockchain.

A problem exists with this dichotomy between public and private blockchains in that blockchains are unable to selectively protect individual records on the network using access lists that are defined when records are provided and/or accessed on the network. For example, some blockchains may include records that may have fields that can be left unrestricted and available for access to any node on the network. At the same time, some fields in a record may be confidential such that only a subset of the nodes on the network should have access. Simply encrypting the entire record is not feasible because private information in the record is often necessary for executing smart contracts in the blockchain network and generating a consensus decision. Currently, no blockchain solutions exist that provide methods for selectively securing portions of records in the blockchain such that they are only accessible to a subset of the available blockchain nodes.

The embodiments described herein solve these and other technical problems by providing methods and systems for securely sharing information in a blockchain with selected nodes. For example, these embodiments provide methods for dynamically selecting a subset of nodes in a blockchain network with which to share sensitive fields in a record. These embodiments may also share public, non-sensitive fields of the same records such that they are accessible to all nodes in the network. In contrast to existing solutions, encrypted private fields and open public fields may be simultaneously stored in the same record while maintaining the desired security.

In some embodiments, when a record is provided from a client application to be added to a blockchain, that record is typically received by a node in a blockchain network. Nodes in traditional blockchain networks may be altered to include a secure node component as part of the node architecture. The secure node component can receive or access a list of other nodes that are authorized to have full access to the record. Records may have a combination of public and/or private fields. The public fields may be accessible by any device with access to the blockchain. In contrast, the private fields may be accessible only to nodes that are specified by an access list. The access list may be received from the client application or may be stored in the blockchain network.

When the record is received, the secure portion of the node can access a first encryption key used for selectively encrypting private fields in the new record. This first encryption key may be a symmetric encryption key that may be specific to the receiving node and any other authorized nodes on the blockchain network. This encryption key and be used to encrypt the private fields in the record. This encryption key can then be encrypted using public keys for other authorized nodes on the network. The receiving node can then send a protected version of the record with the encrypted private fields to each of the other authorized nodes. The receiving node may also send the first encryption key to each of the authorized nodes after being encrypted using the nodes' public keys.

When authorized nodes receive the protected record, they can decrypt the first encryption key using their individual private keys. The first encryption key can then be used to decrypt the private fields in the record. The authorized nodes can then execute any smart contracts using public/private data in the record and provide a consensus decision by executing a consensus mechanism on the record. After consensus is reached, the authorized nodes may send consensus decisions to the receiving node. The receiving node may then broadcast the protected record with the encrypted private fields to the rest of the blockchain network such that the protected record can be committed to the existing blockchain.

Any of the authorized nodes may receive requests in the future from client applications to access the protected record. To do so, the first receiving node described above may transmit a key-value entry to each of the authorized nodes. This entry may have a key based on a hash of the record ID and the ID of each individual node. The corresponding value may include the first encryption key that is encrypted using each individual node's public key. This key-value entry can be stored in the key-value stores for each authorized node. When access is requested, the authorized node can provide a hash of the record ID and the node ID to the key-value store to retrieve the first encryption key, which may be decrypted using the node's private key. The authorized node may then decrypt the private fields in the record and provide the unencrypted record to the client application.

FIG. 1 illustrates an architecture diagram of a blockchain network 100, according to some embodiments. The blockchain network 100 may include a plurality of nodes 108 that are able to receive new records to add to the blockchain network. Each of the nodes 108 in the blockchain network may include a host machine running a blockchain core process. Each node may also represent a single user and/or a plurality of users. The blockchain core process may operate in a standalone mode or as a logical entity having blockchain core processes running on multiple hosts in a cluster mode. In some embodiments, the blockchain network 100 formed by the nodes 108 may be implemented using any existing blockchain network technology.

Some embodiments need not change the existing functionality of the nodes 108, but may instead add additional functionality to handle encryption operations as described below. Therefore, one of the advantages provided by some embodiments is to provide the additional functionality in the form of secure node components 106 that may be provided as a plug-in or other form of auxiliary software component that leverages the existing functionality of the blockchain nodes 108 in the blockchain network 100. For example, an existing blockchain network 100 with nodes 108 may be set up and operate on a plurality of computer systems. The embodiments described herein may be installed in the existing blockchain network to add the secure node components 106 to each of the nodes 108. The secure node components 106 may intercept requests from both inside and outside the network 100 and perform encryption/decryption operations as described below.

The blockchain network 100 may receive requests from client applications 102 that are external to the blockchain network. For example, client applications 102 may include financial software, enterprise software, mobile applications, web-based applications, and/or any other type of computing application. These client applications 102 may operate on standalone computers, smart phones, tablet computers, laptop computers, and/or any other type of computing device. The client applications 102 may also operate in a cloud environment. The client applications 102 may generate lists of transactions or other records that are provided to the blockchain network 100 to be added to the blockchain. In some embodiments, the client application 102 may also provide an access list that identifies users and/or nodes in the blockchain network 100 that are authorized to view private fields in the submitted records.

When a new record is received, the secured node components 106 may parse the record and determine whether any of the fields in the record are designated as private fields. If no private fields exist, the secure node component 106 can pass the record to the nodes 108 in the blockchain network 100 without restriction. However, if private fields do exist in the record, the secure node component 106 may instead request a new encryption key from a Key Management Service (KMS). The KMSs 104 may include a managed service that controls and creates encryption keys for each of the nodes 108. In some embodiments, each of the nodes 108 may be associated with corresponding KMSs 104 in a one-to-one relationship such that other nodes 108 in the blockchain network 100 cannot access the KMSs 104 of other nodes 108.

The secure node components 106 may use encryption keys from the KMS 104 to selectively encrypt the private fields in the data record before it is passed to other authorized nodes in the blockchain network 100. As used herein, the term "authorized nodes" may refer specifically to nodes that are authorized to access the private fields in a record. Authorized nodes may also be designated to execute a consensus mechanism on the record and provide a consensus decision to the receiving node. The "receiving node" may refer to a specific node in the blockchain network 100 that receives a request from a client application 102. For example, a receiving node may refer to a node that receives a request to add a record to the blockchain or to access/update an existing record in the blockchain.

The receiving node may also encrypt the encryption key used to encrypt the private fields such that it can only be accessed by the authorized nodes. For example, the receiving node may encrypt the encryption key using public keys for each of the authorized nodes. The encrypted key can then be sent to each of the individual authorized nodes along with the record having the encrypted private fields. This allows the individual nodes to decrypt the private fields in order to execute smart contracts or execute a consensus mechanism. This also prevents unauthorized nodes in the blockchain network from having access to the private fields. The individual transactions and encryption operations for adding a record to the blockchain and/or accessing existing records in the blockchain with private fields are described in detail in the following figures.

Figure 2:
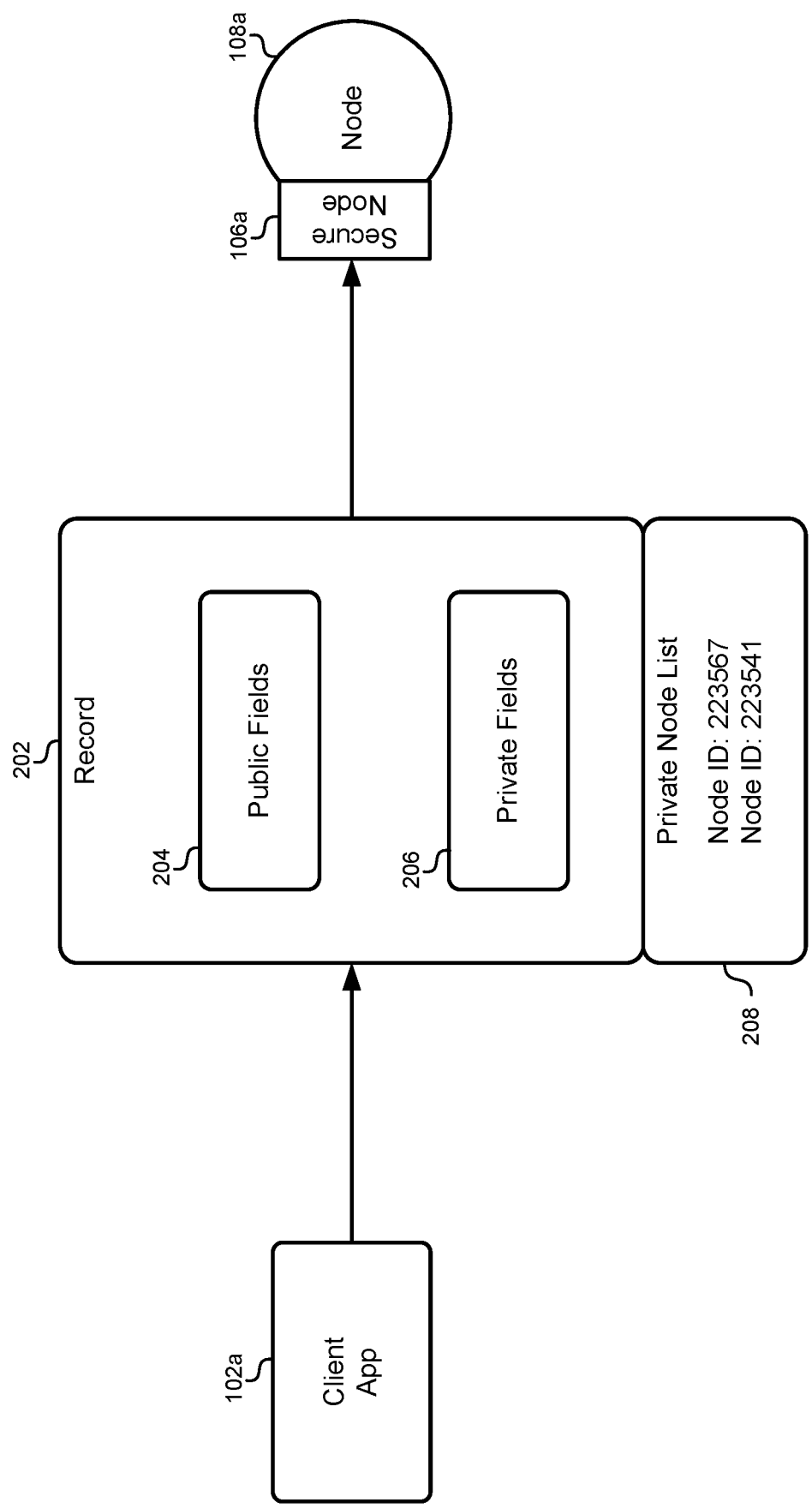
FIG. 2 illustrates a simplified structure of a record received from a client application, according to some embodiments.

FIG. 2 illustrates a simplified structure of a record 202 received from a client application 102a, according to some embodiments. As described above, a specific client application 102a may provide a record 202 to the blockchain network 100 to be added to the blockchain. The record 202 may include one or more public fields 204. Public fields may be defined as fields that are accessible to any of the nodes in the blockchain network. In some embodiments, public fields may also be defined as fields that are accessible to any client device making the request of the blockchain network, while in other embodiments, the "public" nature of these fields 204 need not have any bearing on whether they are publicly accessible outside of the nodes in the blockchain network. Therefore, these public fields 204 may be part of a private blockchain network such that they are not accessible outside of the blockchain network without permission.

The record 202 may also include one or more private fields 206. When these private fields 206 are provided from the client application 102a, the private fields 206 may be in an unencrypted format along with the public fields 204. Some embodiments may include flags or other designators in the record 202 that indicate to a secure node component 106a that particular fields should be treated as private. Private fields 206 may include portions of a transaction or record that include private information, such as a Social Security number, bank account number, credit card number, and/or any other personal or confidential information. These private fields 206 may also include information that, though private, may be required for the execution of smart contracts at various nodes in the blockchain network.

In some embodiments, the record 202 need not include both public fields 204 and private fields 206 simultaneously. For example, some records 202 may include one or more public fields 204 and zero or more private fields 206. Similarly, some records 202 may include one or more private fields 206 and zero or more public fields 204. This may lead to records 202 that are designated as entirely public and/or entirely private being submitted to the blockchain network. However, other embodiments may include a combination of public fields 204 and private fields 206. These records 202 with a combination of these two field types may be stored publicly in the blockchain network such that the public fields 204 are accessible by any node in the blockchain network and the private fields 206 are only accessible to authorized nodes in the blockchain network.

The client application 102a may provide an access list or other designation of authorized nodes in the blockchain network. For example, access list 208 may be provided that includes a list of nodes in the blockchain network that may access the private fields 206. The access list may include a list of identifiers for each of the authorized nodes, such as a list of node IDs, node IP addresses, node locations, node server IDs, and/or any other identifier that may uniquely identify a particular node. The access list 208 may be provided as part of the record 202, such as a field in the record 202. The access list 208 may alternatively be provided as part of a data packet that includes the record 202 such that it remains separate from the record 202. The access list 208 may also be provided separately from the record 202. For example, the client application 102a may provide the access list 208 to the secure node component 106a before or after sending the record 202. In some embodiments, the access list 208 may be required for each individual record transmitted by the client application 102a to the blockchain network. In some embodiments, the access list 208 may be used for a plurality of records that are transmitted to the blockchain network. For example, the client application 102a may provide the access list 208, and may then provide a plurality of records such that the access of each of the plurality of records is governed by the same access list 208. The access list 208 may be stored at the secure node component 106a for use with future records transmitted by the client application 102a. For example, the client application 102a may provide a plurality of access lists to the secure node component 106a, and may simply select an existing access list stored at the secure node component 106a for each record or batch of records provided to the secure node component 106a.

Figure 3:
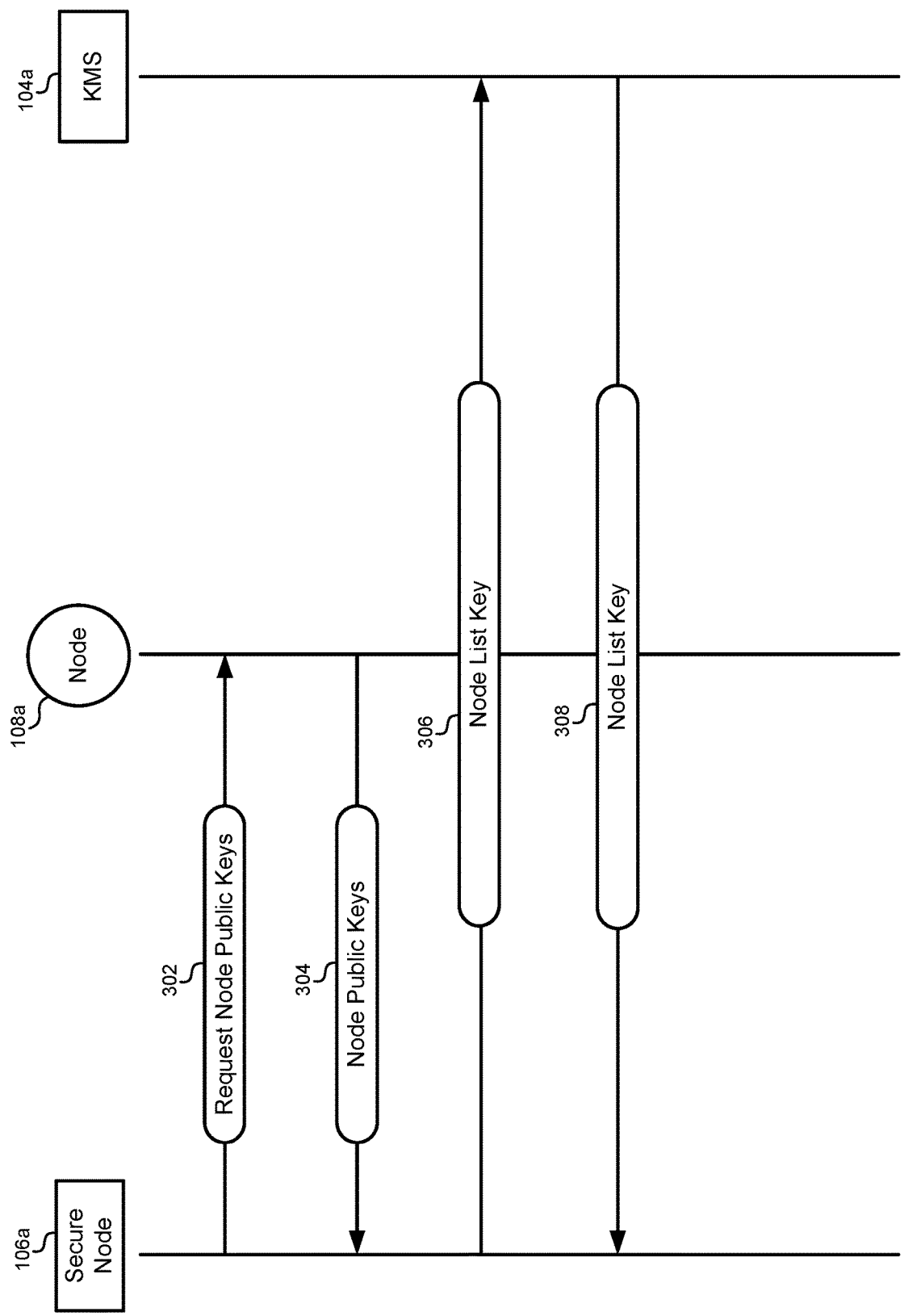
FIG. 3 illustrates a flow diagram of a process for receiving a record with private fields, according to some embodiments.

FIG. 3 illustrates a flow diagram of a process for receiving a record with private fields, according to some embodiments. This example may continue the process described above in FIG. 2. Specifically, the secure node component 106a may have received a record uploaded from the client application 102a to be added to the blockchain network 100. The uploaded record may include one or more private fields. Optionally, the record may also include one or more public fields. The secure node component 106a may also have received and/or have access to an access list that indicates a subset of the nodes 108 in the blockchain network 100 that are authorized to access the private fields in the uploaded record. Referring back to FIG. 1, the secure node component 106a and the node 108a may be referred to as the "receiving node" for purposes of this process. The receiving node may also be referred to as a "first node" in the blockchain network 100.

The secure node component 106a may first parse the record and identify any private fields in the record. These private fields may be designated by locations in the record, flags applied to data fields in the record, and/or any other means of identifying data as private versus public. If the secure node component 106a determines that no private fields are included in the record, the rest of the process indicated in FIG. 3 need not be carried out, and the record may be passed to nodes in the blockchain network 100 in the traditional manner.

If the secure node component 106a determines that the record does include one or more private fields, the secure node component 106 a may request a set of public keys for each of the authorized nodes in the access list (302). Public keys for each of the nodes 108 in the blockchain network 100 may be available through normal mechanisms that are part of the traditional blockchain network 100. For example, the blockchain network 100 may include a central authority or KMS that includes public keys for each of the nodes 108 in the network 100. These public keys can be looked up and provided to the secure node component 106a. If they are not readily available from a central lookup service, the node 108a may request these public keys from each of the authorized nodes on the blockchain network 100. Once the public keys are acquired by the node 108a, they may be provided to the secure node component 106a (304).

In addition to retrieving the public keys, the secure node component 106a may request an encryption key for encrypting the private fields of the record. This encryption key may be referred to herein as a "first encryption key" and may include a symmetric encryption key. The first encryption key may also be designated in this description and in the corresponding figures as "$K_s$". In some embodiments, the secure node component 106a may request the first encryption key from a KMS 104a that is specifically associated with the node 108a (306). The KMS 104a may then provide an encrypted form of the first encryption key to the secure node component 106a (308). The encrypted first encryption key may be provided in a key-value entry referred to as a "node list key" because the first encryption key may be identified based on the receiving node and the list of authorized nodes. The format for the node list key is described in greater detail below.

In some embodiments, using the KMS 104a to store and retrieve the first encryption key may be optional. For example, the secure node component 106a may include an internal key management system such that the secure node 106a may generate, store, manage, and cycle encryption keys for any of the encryption processes described below. Using the KMS 104a to manage the first encryption key is merely provided as one example and is not meant to be limiting.

Figure 4:
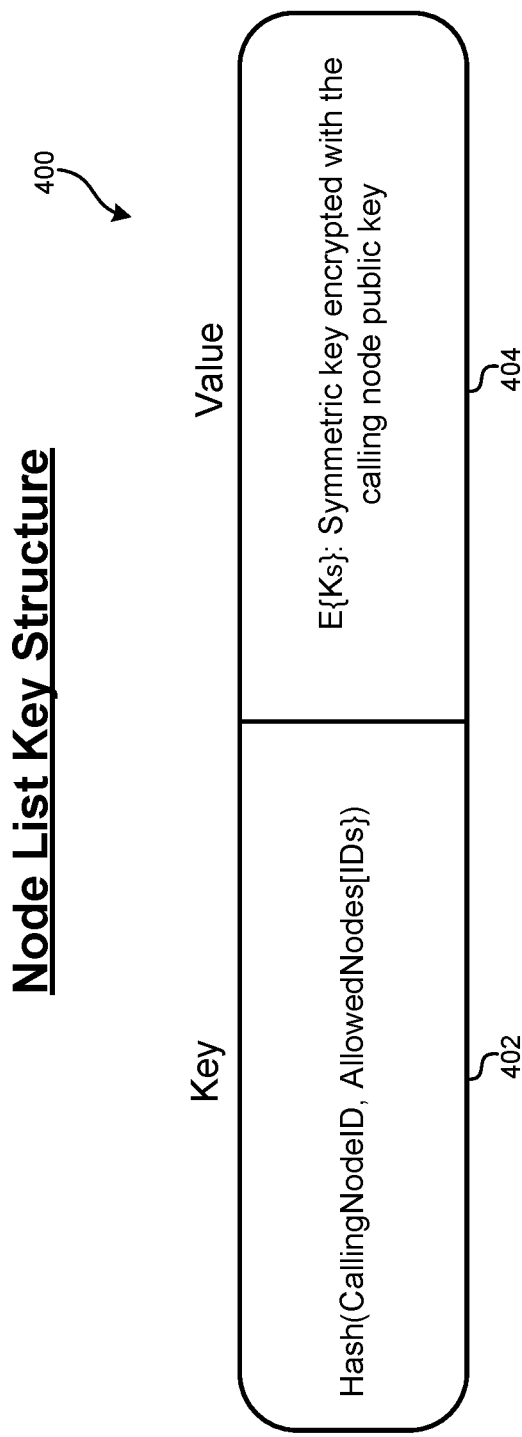
FIG. 4 illustrates a key-value entry for the first encryption key, according to some embodiments.

FIG. 4 illustrates a key-value entry 400 for the first encryption key, according to some embodiments. The KMS 104a may be implemented using any type of data store. However, some embodiments may implement the KMS 104a using a key-value store such that encryption keys can be stored in an encrypted form as a value with a corresponding key that may be used to look up the encryption key. For example, to retrieve the first encryption key from the KMS 104a, the secure node component 106a may generate a lookup key by hashing certain values and submit the hashed value to the KMS 104a. The KMS 104a may then use the lookup key to identify a particular value in the key-value store and return that value to the secure node component 106a. The return value may include an encryption key, such as the first encryption key, that has been encrypted using a different encryption key.

In some embodiments, the first encryption key may be specific to the receiving node and the list of the authorized nodes. Therefore, a key-value entry 400 for the first encryption key may be descriptively referred to as a node list key, the structure of which is illustrated in FIG. 4. The key 402 portion of the entry 400 may correspond to a hash value that uses the node ID of the calling node making the request (e.g., the receiving node) along with a list of node IDs corresponding to the authorized nodes. The secure node component 106a may gather these node IDs and provide them as an input to a hash function (e.g, SHA-256). The output of that hash function may then be used as the key 402 that is sent to the KMS 104a to retrieve the corresponding value.

Note that this key 402 need not be specific to a particular record or to particular private fields in a particular record. Instead, this key 402 may be generically used for any record received by the receiving node and shared with the same list of authorized nodes. As described above, the same access list may be used for multiple records to be added to the blockchain. The node list key structure illustrated in FIG. 4 provides a technical advantage that allows the same entry 400 in the key-value store to be reused repeatedly for multiple records that have the same set of authorized nodes.

When the KMS 104a receives the key 402, it may look up the corresponding value 404 and provide the corresponding value 404 to the secure node component 106a. In some embodiments, the KMS 104a may store a copy of the first encryption key as the value 404. For additional security, the KMS 104a may alternatively store an encrypted version of the first encryption key. For example, the value 404 may include the first encryption key that has been encrypted using the public key of the calling node (e.g., the receiving node 108a). When the value 404 is received by the secure node component 106a, the secure node component 106a may decrypt the first encryption key using its corresponding private key for the node 108a, at which point the secure node component 106a may have full access to the unencrypted version of the first encryption key.

Figure 5:
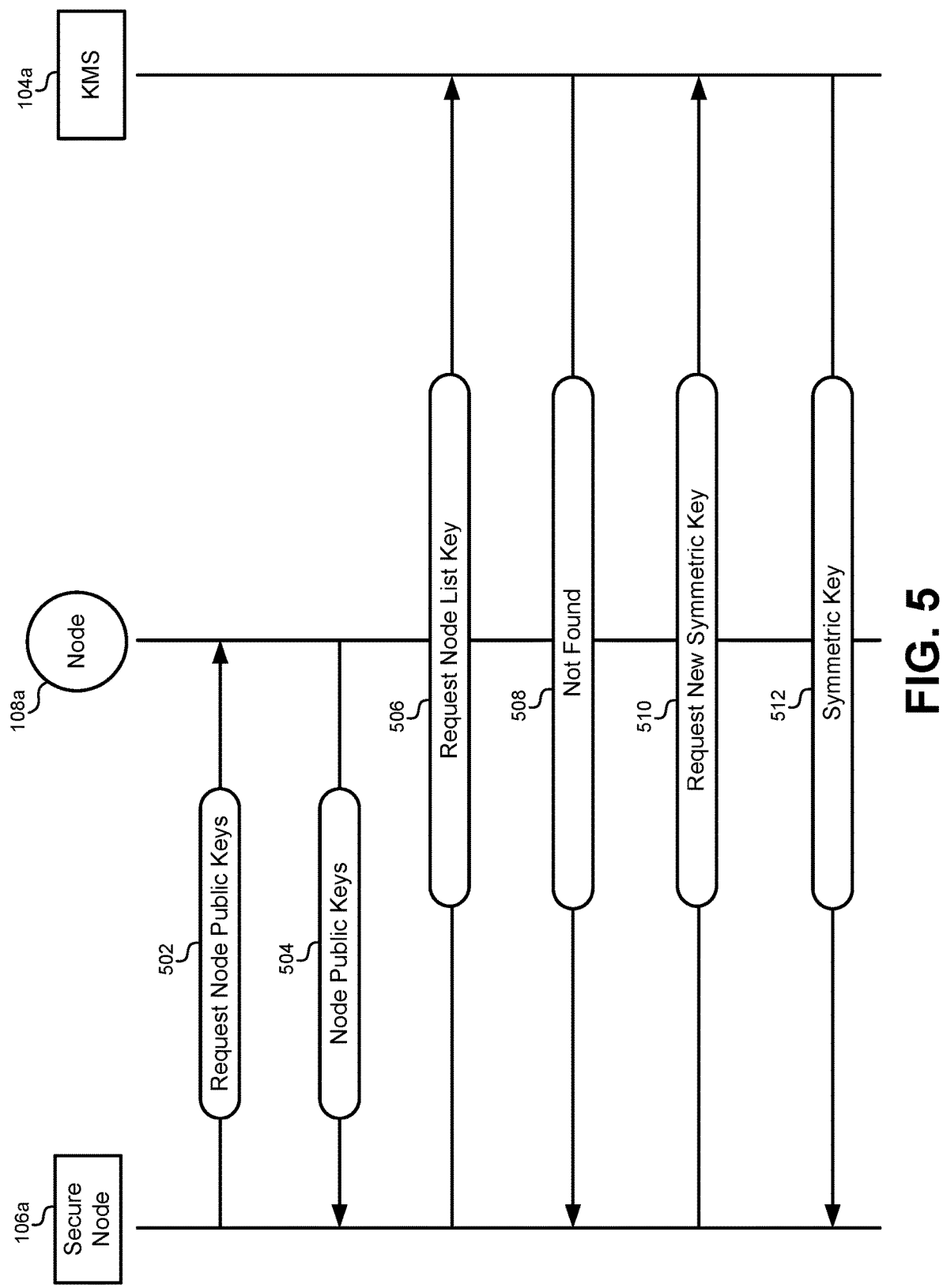
FIG. 5 illustrates a flow diagram illustrating a process for requesting a new first encryption key, according to some embodiments.

FIG. 5 illustrates a flow diagram illustrating a process for requesting a new first encryption key, according to some embodiments. The process described above in relation to FIG. 3 may be used when a corresponding first encryption key is already available either at the secure node component 106a or from the KMS 104a. For example, the first encryption key may already be available if records with private fields have previously been submitted to the receiving node 108a using the same access list as the current record. As described above, the first encryption key may be specific to the receiving node and the authorized nodes such that it can be reused for future records with the same access list.

However, in cases where an existing first encryption key is not available, a new first encryption key may be requested. This situation may arise if the receiving node 108a has not received a record using a particular access list when adding previous records. The situation may also arise if the first encryption key has expired or otherwise become stale or unavailable. In some embodiments, the secure node component 106a may generate a new first encryption key on its own. In other embodiments, the secure node component 106a may instead request that a new key be generated by the KMS 104a.

In FIG. 5, the secure node component 106a may request (502) and receive (504) the public keys for the authorized nodes on the access list as described above. The secure node component 106a may also request the entry for the node list key that includes a first encryption key (506). However, when that entry does not exist at the KMS 104a, an error message may be returned to the secure node component 106a indicating that a value with the submitted key was not found (508). At this point, the secure node component 106a may submit a request to the KMS 104a for a new encryption key (510). The secure node component 106a may specify that the new encryption key have certain cryptographic properties, such as having a certain bit length, being usable as a symmetric key, and so forth. The KMS 104a may respond by generating a new first encryption key which may be provided to the secure node component 106a (512).

In some embodiments, the KMS 104a may provide the first encryption key directly to the secure node component 106a. Alternatively, the first encryption key may first be encrypted using the public key of the node 108a before being transmitted from the KMS 104a. In some embodiments, the KMS 104a may also generate a new entry that stores the new encryption key in its key-value store. For example, the secure node component 106a may provide a hashed key value 402 as described above that is based on a hash of the receiving node ID and the node IDs of each of the authorized nodes in the access list. This hash value may be submitted as part of the request for the new encryption key (510). After generating the new encryption key, the KMS 104a may store an entry 400 in the key-value store for the new encryption key. Alternatively, the secure node component 106a may later provide the entry 400 to the KMS 104a after the record is committed to the blockchain. This process will be described in greater detail below after the record is committed to the blockchain.

Figure 6:
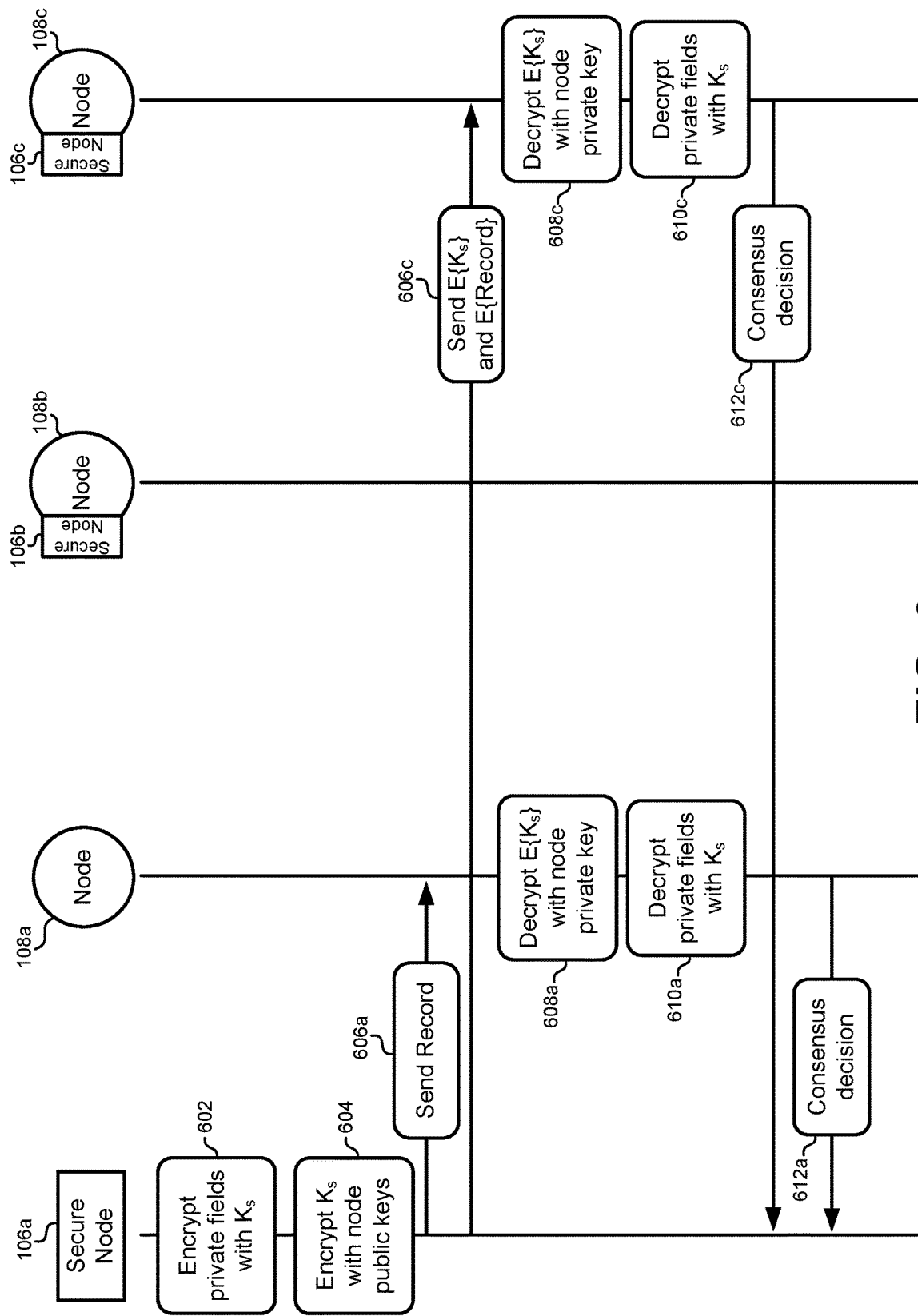
FIG. 6 illustrates a flow diagram for encrypting the private fields of the record and sending the record to the authorized nodes for a consensus decision, according to some embodiments.

FIG. 6 illustrates a flow diagram for encrypting the private fields of the record and sending the record to the authorized nodes for a consensus decision, according to some embodiments. At this point, the secure node component 106a may have access to the first encryption key. Using the first encryption key, the secure node component 106a may encrypt the private fields in the record using the first encryption key (602). This process may include leaving any of the public fields in the record in an unencrypted format. This may allow any node in the blockchain network to read the public fields in the record while still protecting the private fields in the record from access by unauthorized nodes. In some cases, the entire record may be comprised of private fields without any public fields. In this situation, the secure node component 106a may encrypt all the fields in the record. An encryption algorithm may be executed on each field individually. Alternatively, the encryption algorithm may be executed on all of the private fields together in the record.

In addition to encrypt in the private fields in the record, some embodiments may also encrypt the first encryption key such that it may be sent securely to each of the additional nodes in the authorized list. As described above, the receiving node 108a may request or have access to public keys belonging to each of the authorized nodes in the access list. Therefore, the secure node component 106a may encrypt the first encryption key specifically for each authorized node using the public key for the authorized nodes. For example, in the example of FIG. 6, the receiving node 108a and node 108c may be considered authorized nodes to access the private fields in the record. Therefore, the secure node component 106a may encrypt the first encryption key using the public key of node 108c (604). Any other nodes in the authorized access list may also have the first encryption key encrypted using their specific public keys.

After encrypting the private fields in the record, the record may be referred to as a protected record or a secure record, in that the private fields are protected or secured against unauthorized access. At this point, the protected record may be distributed to the authorized nodes in the access list. In some embodiments, the secure node component 106a may send an unencrypted record to the receiving node 108a (606a) because the receiving node 108a is authorized to access the protected fields. In other embodiments, the secure node component 106a may instead send the protected record to the receiving node 108a, which may then use its private key to decrypt the first encryption key, and use the first encryption key to decrypt the private fields in the record.

Additionally, the secure node component 106a may send the protected record and/or the encrypted first encryption key to any or all of the authorized nodes in the access list (606c). In this example, the secure node component 106a may send the encryption key encrypted with the public key of node 108c along with the protected record. In some embodiments, the secure node component 106c and/or the node 108c may receive the encrypted first encryption key and decrypt the first encryption key using the private key of the node 108c. The secure node component 106c and/or the node 108c may then use the first encryption key to decrypt the private fields in the protected record.

After decrypting the private fields, the node 108c may execute one or more smart contracts using the private and/or public fields in the record. For example a smart contract may use transactional information in the record to transfer values or information between user accounts. Additionally, the node 108c may execute one or more consensus mechanisms configured to validate the record. Any known consensus mechanism may be used, such as those that are commonly used in standard blockchain networks, such as Proof of Work (PoW), Proof of Stake (PoS), and so forth. In some situations, the node 108c may determine that the private fields are not needed to execute any smart contracts and/or to execute the consensus mechanism. In this case, the node 108c may perform these operations without decrypting the private fields. After reaching a consensus decision, each of the authorized nodes, including the receiving node may send a consensus decision to the receiving node 108a and/or the secure node component 106a.

Figure 7:
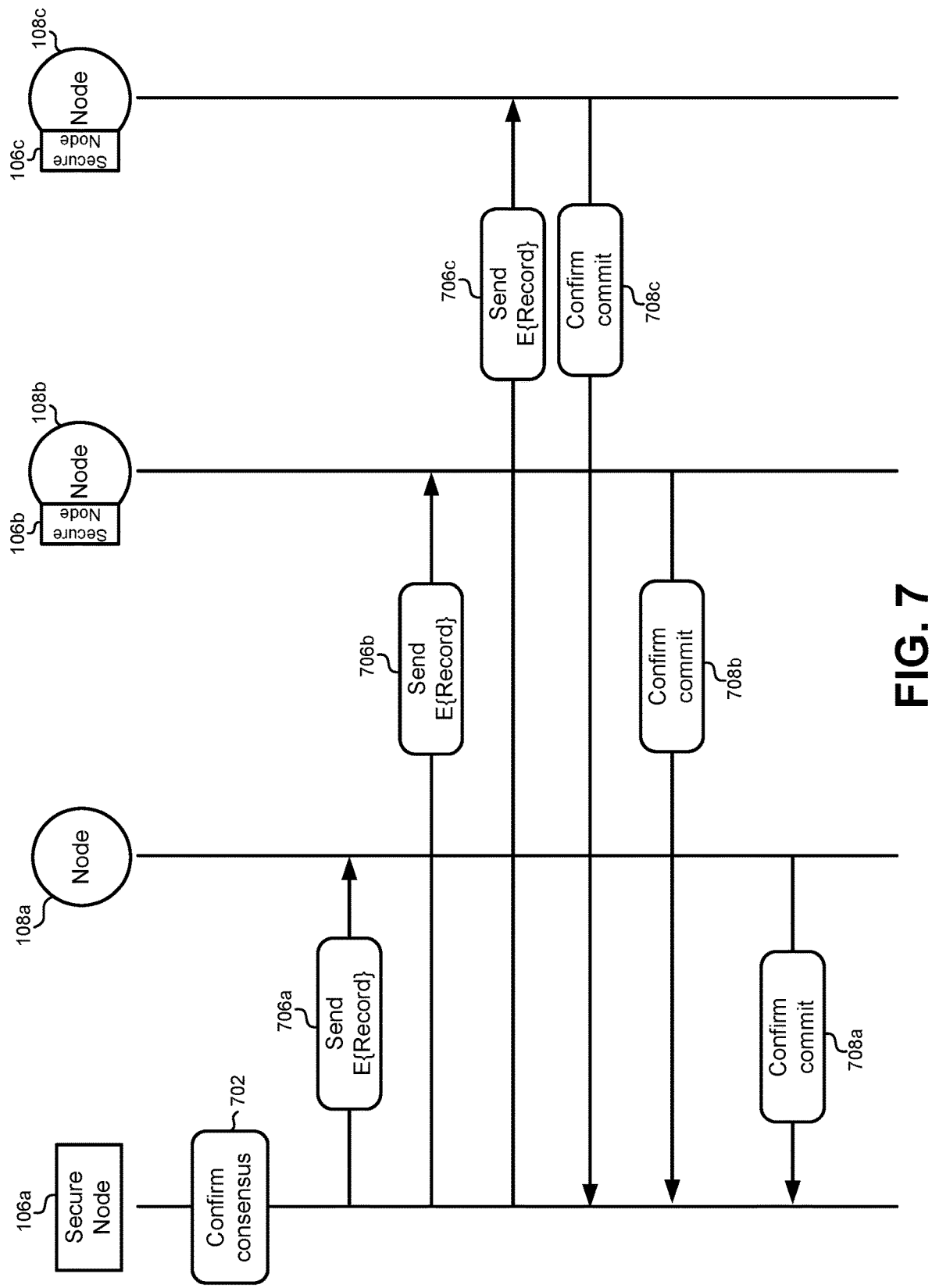
FIG. 7 illustrates a flow diagram of a process for committing a protected record to the blockchain network, according to some embodiments.

FIG. 7 illustrates a flow diagram of a process for committing a protected record to the blockchain network, according to some embodiments. After successfully receiving consensus decisions from a sufficient number of the authorized nodes in the access list, the secure node component 106a may confirm that consensus has been achieved (702). Next, the secure node component 106a may send the record to all of the nodes 108 in the blockchain network to be committed to the blockchain (706). Note that this operation need not be limited to just the authorized nodes in the access list. Instead, the protected record may be sent to any of the nodes in the blockchain network. Because the record is in a protected state with the private fields encrypted, the protected record may be freely shared with any node in the blockchain network. For example, continuing with the example above, node 108b was not included in the access list, and was therefore not granted access to the private fields. However, the protected record may now be sent to node 108b as part of the commit operation (706b).

After consensus and commit operations have been completed successfully, each of the nodes 108 may send a confirmation of the commit to the receiving node 108a and/or the secure node component 106a. If the consensus or commit failed, or if any error occurred due to a blockchain platform-specific issue, the secure node component 106a may instead send a response to the requesting client application indicating that the attempt to add the record to the blockchain was unsuccessful.

Figure 8:
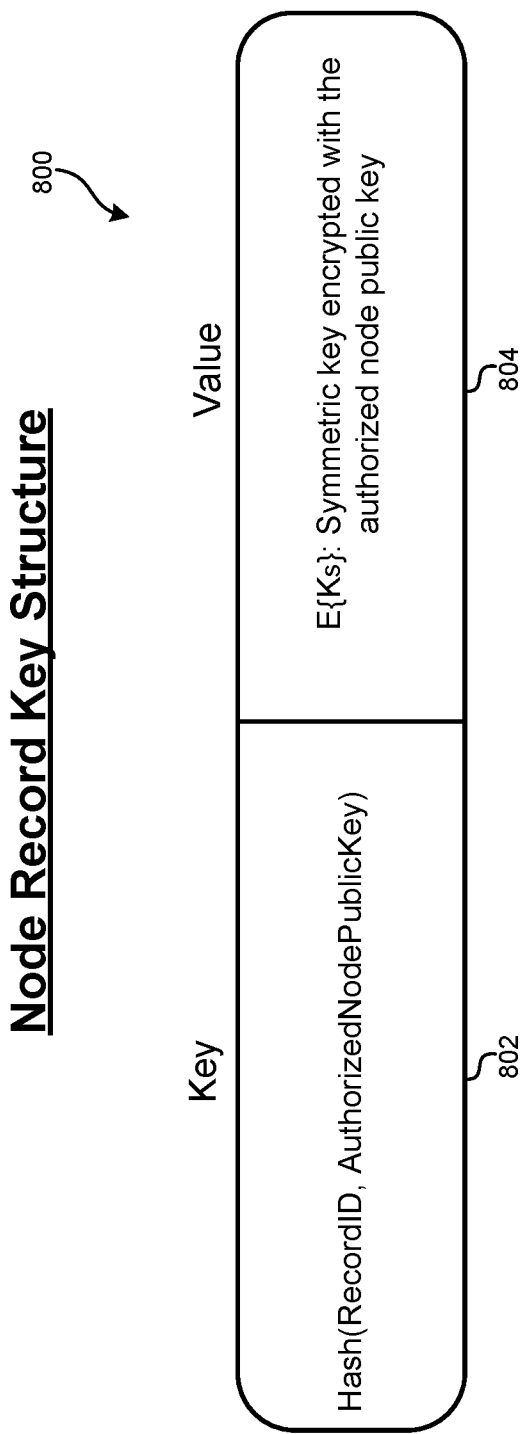
FIG. 8 illustrates a structure of a key-value entry for a node record key, according to some embodiments.

FIG. 8 illustrates a structure of a key-value entry for a node record key, according to some embodiments. As described above, the node list key structure specified a key-value entry that may be used to store the first encryption key for new records that are received by the same receiving node and sent the same list of authorized nodes. However, in some embodiments, this encryption key may only be used to decrypt the private fields at the authorized nodes as part of an initial consensus operation. After the consensus decision has been sent to the receiving node, the first encryption key may be deleted from the authorized nodes such that it is not stored at that time. Client applications may subsequently send requests to any of the authorized nodes to access the record. Because the node list key entry is not keyed by the record itself, none of the nodes would be able to look up the first encryption key for a subsequent access.

The structure of the node record key entry illustrated in FIG. 8 solves this problem by adding an entry to each of the KMSs 104 for each of the authorized nodes. This entry 100 is specific to the record and to the node where access may occur, and thus it may be referred to as a "node record key" in a descriptive sense. This entry 800 may include a key value 802 comprising a hash of an identifier for the particular record, as well as a public key for the authorized node. Therefore, in order to gain access to the private fields in a protected record, the authorized node may create a hash value of the record identifier and the public key for the authorized node. This hash value may then be sent to the corresponding KMS, which may use the hash value as a key to look up a corresponding value in a key-value store. The corresponding value may comprise the first encryption key that has been encrypted with the public key of the authorized node. This value may then be decrypted by the authorized node using its private key, and the first encryption key may then be used to decrypt the private fields in the record.

Figure 9:
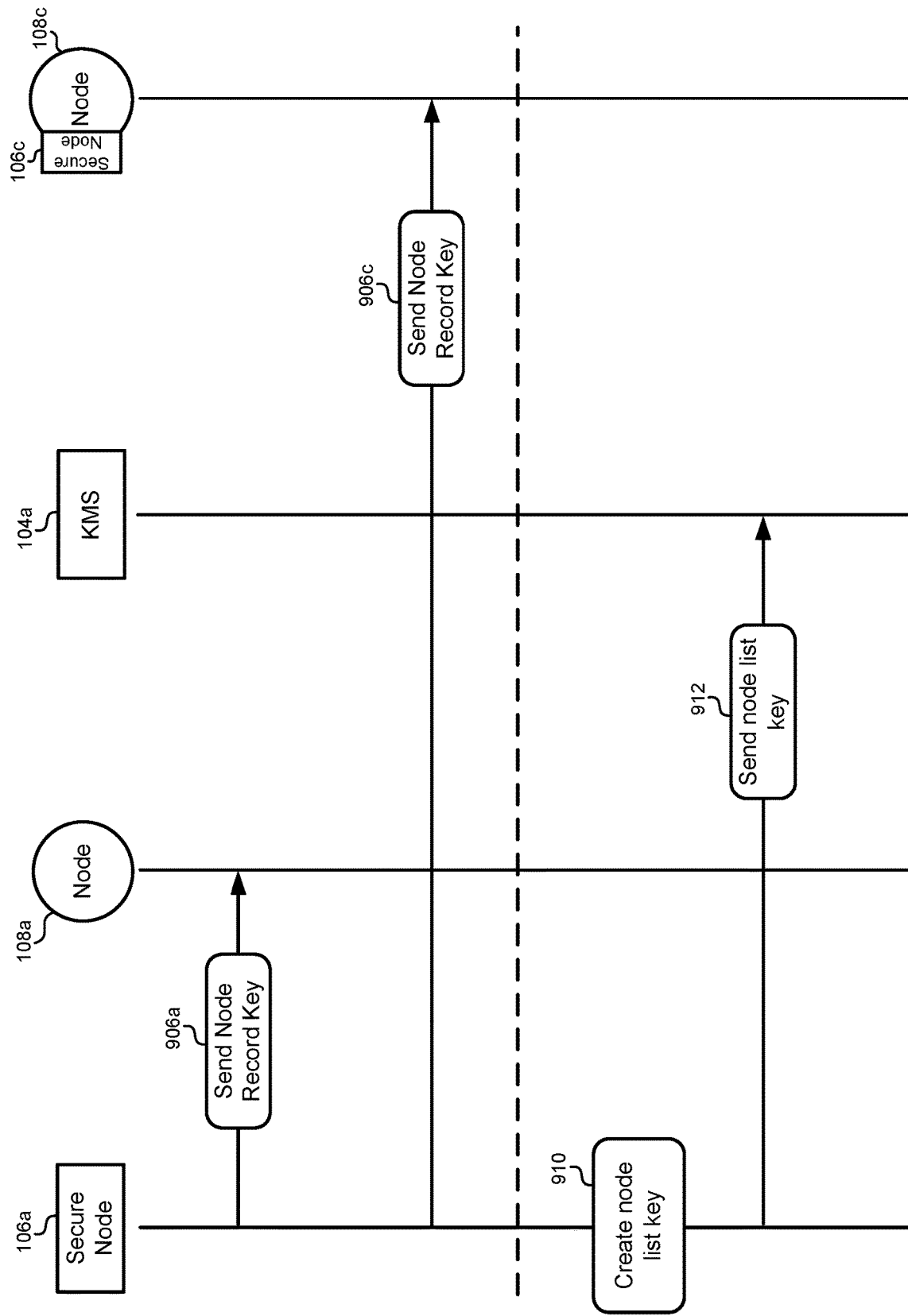
FIG. 9 illustrates a flow diagram of how the node record key and/or the node list key may be generated and stored as part of the process for adding a record to the blockchain, according to some embodiments.

FIG. 9 illustrates a flow diagram of how the node record key and/or the node list key may be generated and stored as part of the process for adding a record to the blockchain, according to some embodiments. The operations in FIG. 9 may be carried out as part of the previous operations described in the examples above. For example, after the node has been successfully committed to the blockchain, the secure node component 106a may create a node record key entry that includes the key and value (e.g., the first encryption key encrypted with each authorized node's public key) described above. This node record key may then be sent to each of the authorized nodes in the blockchain network (906). Each of the authorized nodes may then store the node record key in their corresponding KMS 104. As described in greater detail below, this entry in the KMS 104 may be used to grant subsequent access to the protected record for a client application requesting access through one of the authorized nodes.

Additionally, recall that FIG. 5 illustrated a situation where the first encryption key for a particular receiving node and access node list did not yet exist in the KMS 104a for the receiving node 108a. In that case, a request was made to the KMS 104a to create a new first encryption key to add the record to the blockchain. In FIG. 9, after the protected record has successfully been committed to the blockchain, the first encryption key may also be added to the KMS 104a for the receiving node 108a to be reused in the future when adding new records with the same authorized node list. For example, the secure node component 106a may now generate a node list key entry using the format described above in FIG. 4 (910). This entry may then be sent to the KMS 104a to be added to the key-value store (912).

Figure 10:
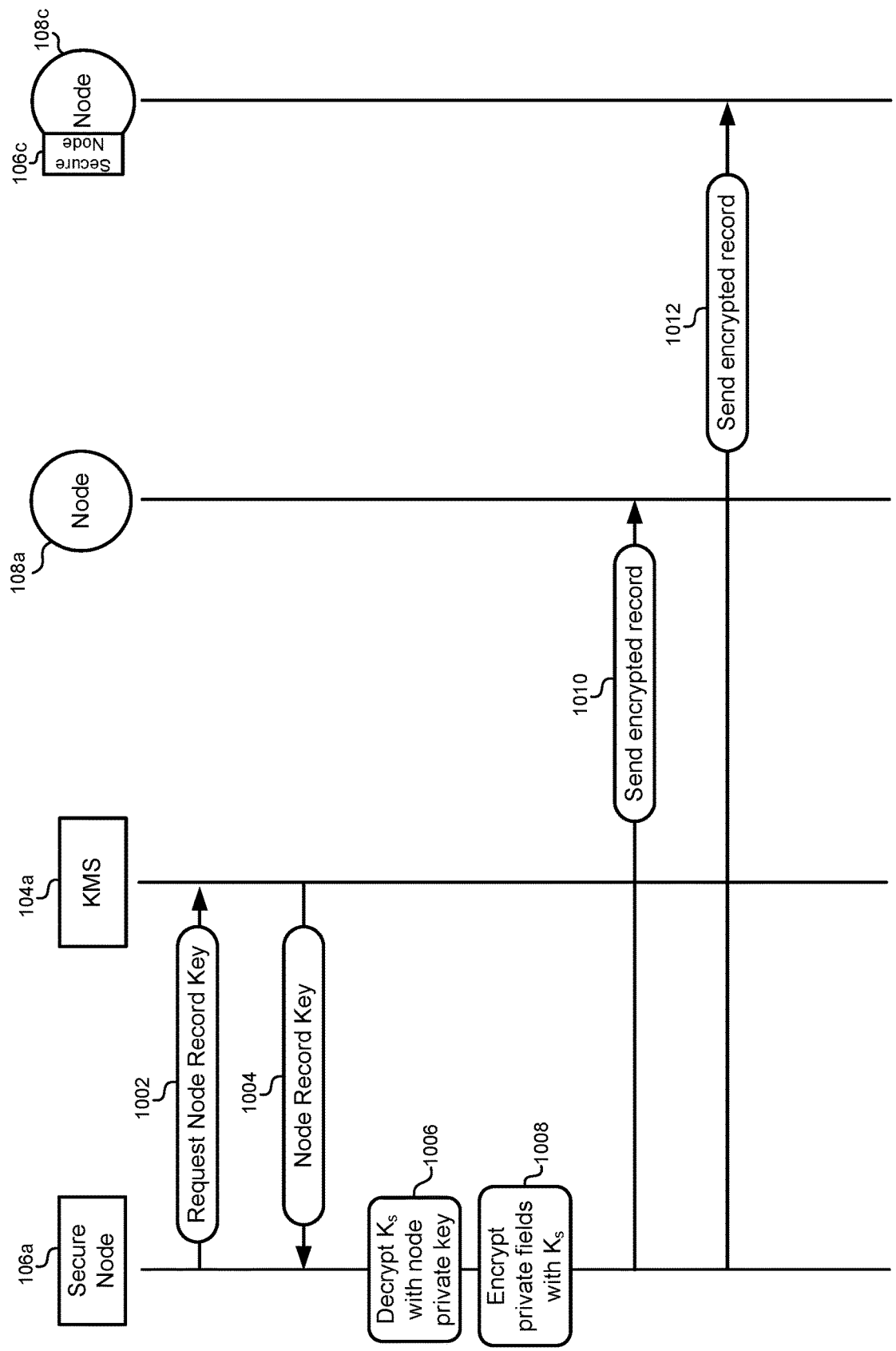
FIG. 10 illustrates a flow diagram of a process for updating an existing protected record in the blockchain network, according to some embodiments.

FIG. 10 illustrates a flow diagram of a process for updating an existing protected record in the blockchain network, according to some embodiments. In this situation, it may be assumed that the record being updated already exists in the blockchain network. Therefore, it may also be assumed that the node record key exists in the KMS 104 for each of the nodes 108. FIG. 10 illustrates only the steps that are different from the process described above for initially adding the record to the blockchain. For example, although not shown explicitly in FIG. 10, this process may first include receiving a record with private fields to update from a client application. The record may have private fields along with an access list of nodes in the blockchain network that are authorized to access the private fields. As described above, the receiving node 108a may retrieve and/or access public keys for each of the other authorized nodes in the access list.

At this point, the secure node component 106a may request the node record key from its corresponding KMS 104a (1002), which may be returned in response (1004). As described above, the node record key may be accessed by virtue of a hash of the record ID and the public key of the receiving node 108a. An error may be returned if the node record key is not found in the KMS 104a, indicating that the client application is attempting to update a record that has not yet been added to the blockchain.

After retrieving the node record key, the secure node component 106a may decrypt the first encryption key using its corresponding private key (1006). The secure node component 106a may then encrypt the private fields in the record (1008) using the process described above for encrypting private fields when the original record is added to the blockchain. The resulting protected record may then be sent to each of the authorized nodes in the access list. For example, the protected record may be sent to node 108a and node 108c, but not sent to node 108b, as it is not in the access list. At this point, each of the authorized nodes may have a copy of the protected record.

Figure 11:
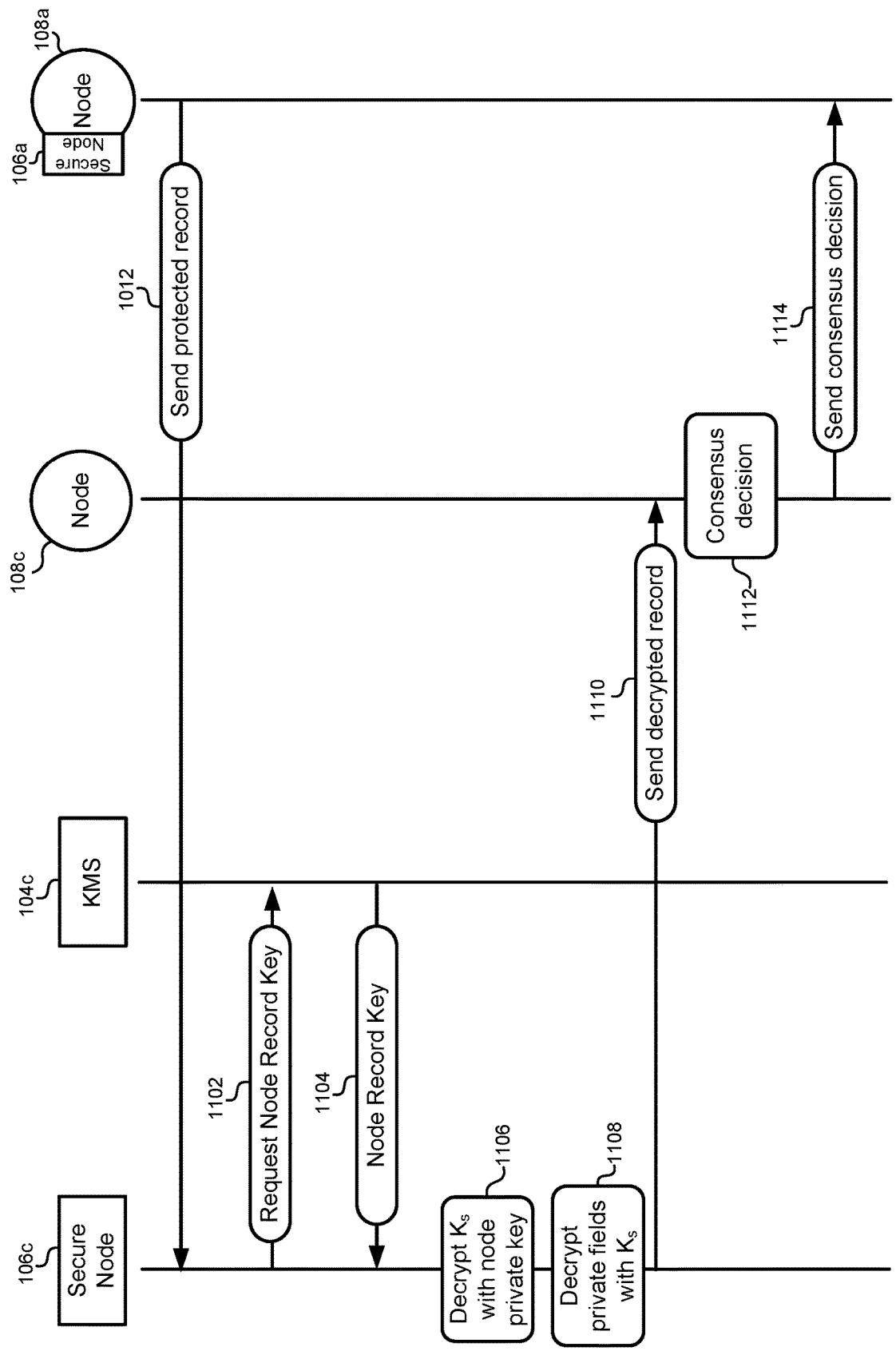
FIG. 11 illustrates a flow diagram for completing the process of updating a protected record at the authorized nodes, according to some embodiments.

FIG. 11 illustrates a flow diagram for completing the process of updating a protected record at the authorized nodes, according to some embodiments. The process carried out in FIG. 11 may be executed at each of the authorized nodes in the access list. As described above, the receiving node 108a may send a copy of the protected record to the secure node component 106c for an authorized node 108c (1012). The secure node component 106c may then request (1102) and retrieve (1104) the node record key 1104 from the corresponding KMS 104c. If the node record key is not found for that particular record, an error may be generated and sent back to the receiving node 108a.

After retrieving the node record key, the first encryption key can be recovered by decrypting the value in the node record private key of the authorized node 108a (1106). The first encryption key can then be used to decrypt the private fields within the protected message (1108). The secure node component 106c may then send the decrypted record to the authorized node 108c (1110). At this stage, the authorized node 108c—along with all the other authorized nodes in the access list—may generate a consensus decision (1112) and send that decision back to the receiving node 108a (1114). After consensus is successfully received from all authorized nodes, the secure node component 106a of the receiving node 108a may send a commit request to all nodes on the blockchain network to commit the updated record to the blockchain.

Note that the process described in FIGS. 10-11 includes some steps that are described in detail in the process for adding the record to the blockchain in the first instance. These steps are not described again in detail in relation to FIGS. 10-11, and it will be understood that any of the steps described above in relation to FIGS. 1-9 may also apply without limitation to the process for updating a record described in relation to FIGS. 10-11.

Figure 12:
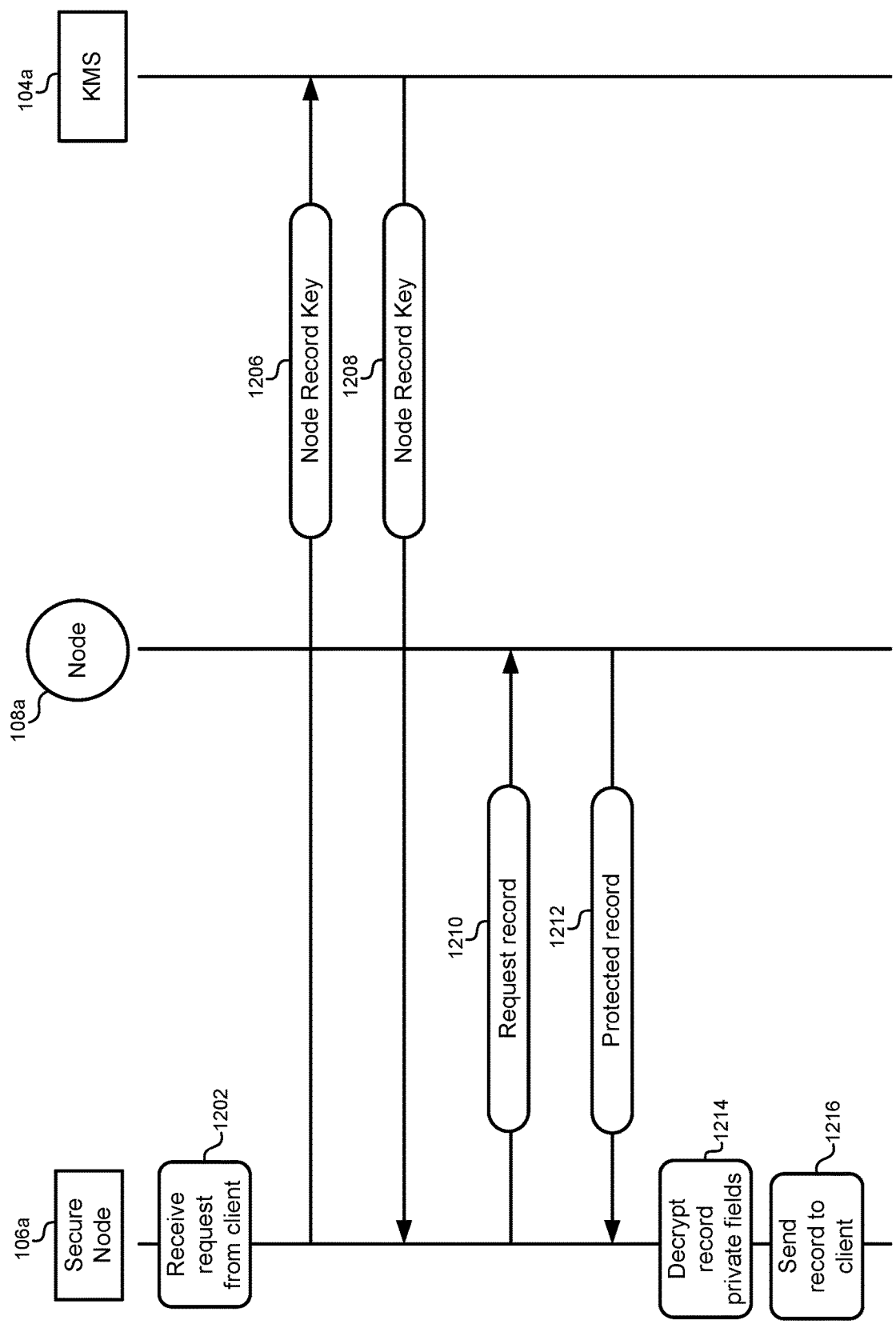
FIG. 12 illustrates a flow diagram for servicing a request to access an existing protected record in the blockchain, according to some embodiments.

FIG. 12 illustrates a flow diagram for servicing a request to access an existing protected record in the blockchain, according to some embodiments. At this point, it may be assumed that any of the processes described above for adding and/or updating the protected record have been previously carried out. This process may begin by receiving a request from a client application (1202). This request may be received by any of the nodes in the blockchain network. The secure node component 106a may determine that the requested record is protected and thus includes one or more private fields. If so, the secure node component 106a may submit a request (1206) to the corresponding KMS 104a to retrieve (1208) a node record key corresponding to the public key for that node 108a and an identifier for the requested record. If the node record key is not found in the KMS 104a, then an error message may be sent to the client application.

After retrieving the node record key, the secure node component 106a may also request the protected record (1210) from the blockchain. The receiving node 108a may retrieve the protected record using standard capabilities of the existing blockchain network. The receiving node 108a may then provide the protected record to the secure node component 106a (1212). As described above, the secure node component 106a may extract the first encryption key from the node record key using its private key. The first encryption key may then be used to decrypt the private fields in the protected record (1214), and the unencrypted record may then be sent to the requesting client application (1216).

Figure 13:
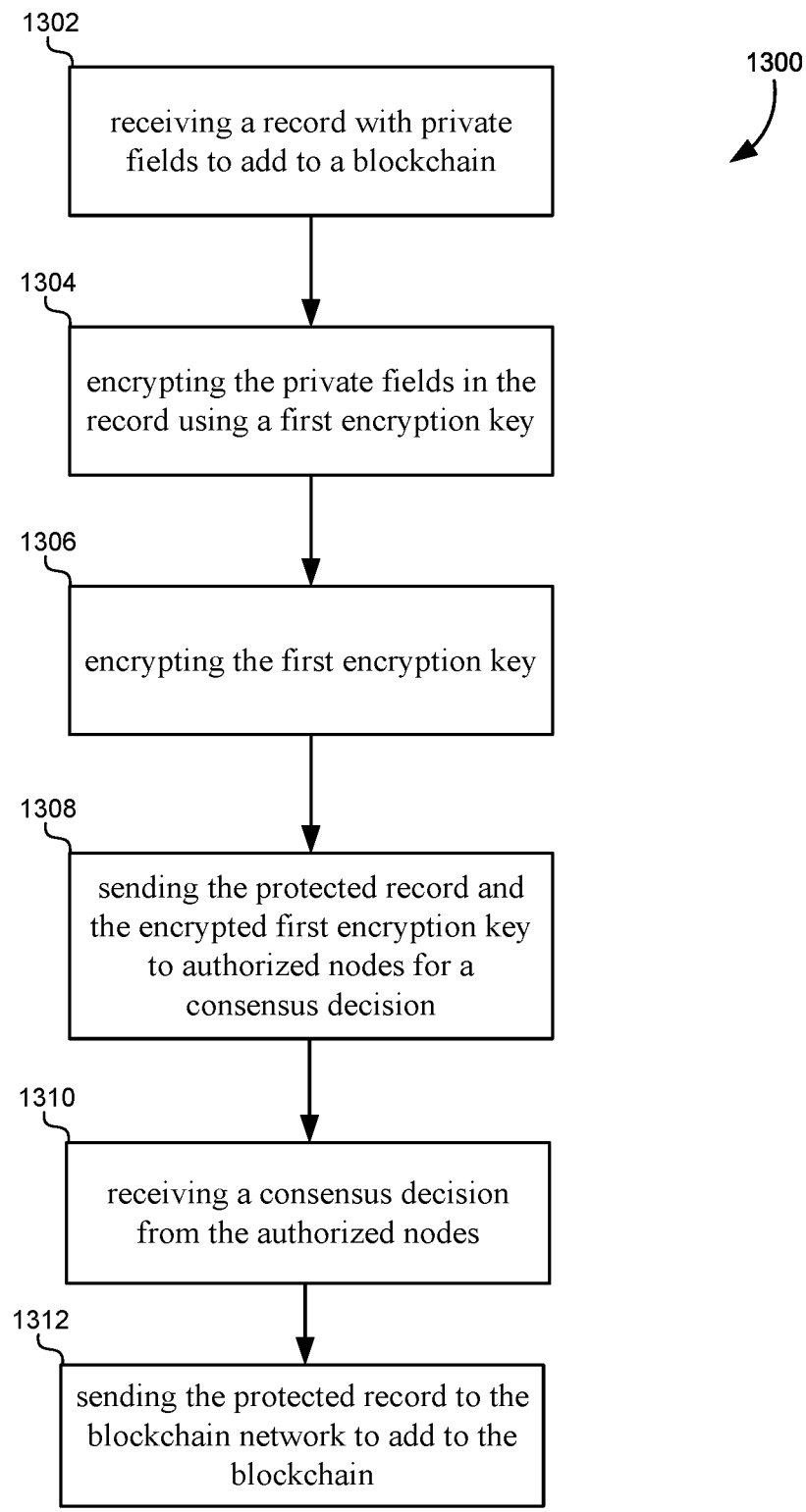
FIG. 13 illustrates a flowchart of a method for protecting private fields in a public record added to a blockchain.

FIG. 13 illustrates a flowchart of a method for protecting private fields in a public record added to a blockchain. The method may include receiving a record to add to a blockchain (1302). The record may include one or more private fields. The record may optionally also include one or more public fields. The request may be received by a secure node component that is coupled to an existing node in a blockchain network. This request may be received according to any of the details described above in this disclosure, including the discussion relating to FIGS. 1-3.

The method may also include encrypting the one or more private fields in the record using a first encryption key to provide a protected record (1304). The first encryption key may be a symmetric encryption key. The first encryption key may be generated and/or retrieved from a KMS that is associated with the receiving node. The private fields in the record may be encrypted while leaving public fields in the record unencrypted. The process for generating, retrieving, storing, and/or using the first encryption key may be executed using any of the description above in this disclosure.

The method may further include decrypting the first encryption key to provide an encrypted first encryption (1306). The first encryption key may be encrypted using the public keys of for each of the authorized nodes in access list. As described above, the first encryption key may then be encrypted in multiple instances, once for each public key for each authorized node. Therefore, the encrypted first encryption key generated in this step may comprise multiple encrypted encryption keys, each encrypted using a different public key.

The method may additionally include sending the protected record and the encrypted first encryption key to one or more authorized nodes in a blockchain network (1308). These authorized nodes may be designated by virtue of an access list received with the record and the request. The authorized nodes may be authorized to access the encrypted private fields in the record to provide a consensus decision. The authorized nodes may also execute one or more smart contracts using the information in the private fields of the record.

The method may further include receiving a consensus decision from the one or more authorized nodes in the blockchain network (1310). Once a sufficient number of consensus decisions have been received, the method may additionally include sending the protected record to the blockchain network to add to the blockchain (1312).

It should be appreciated that the specific steps illustrated in FIG. 13 provide particular methods of adding a record with private fields to a blockchain according to various embodiments. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
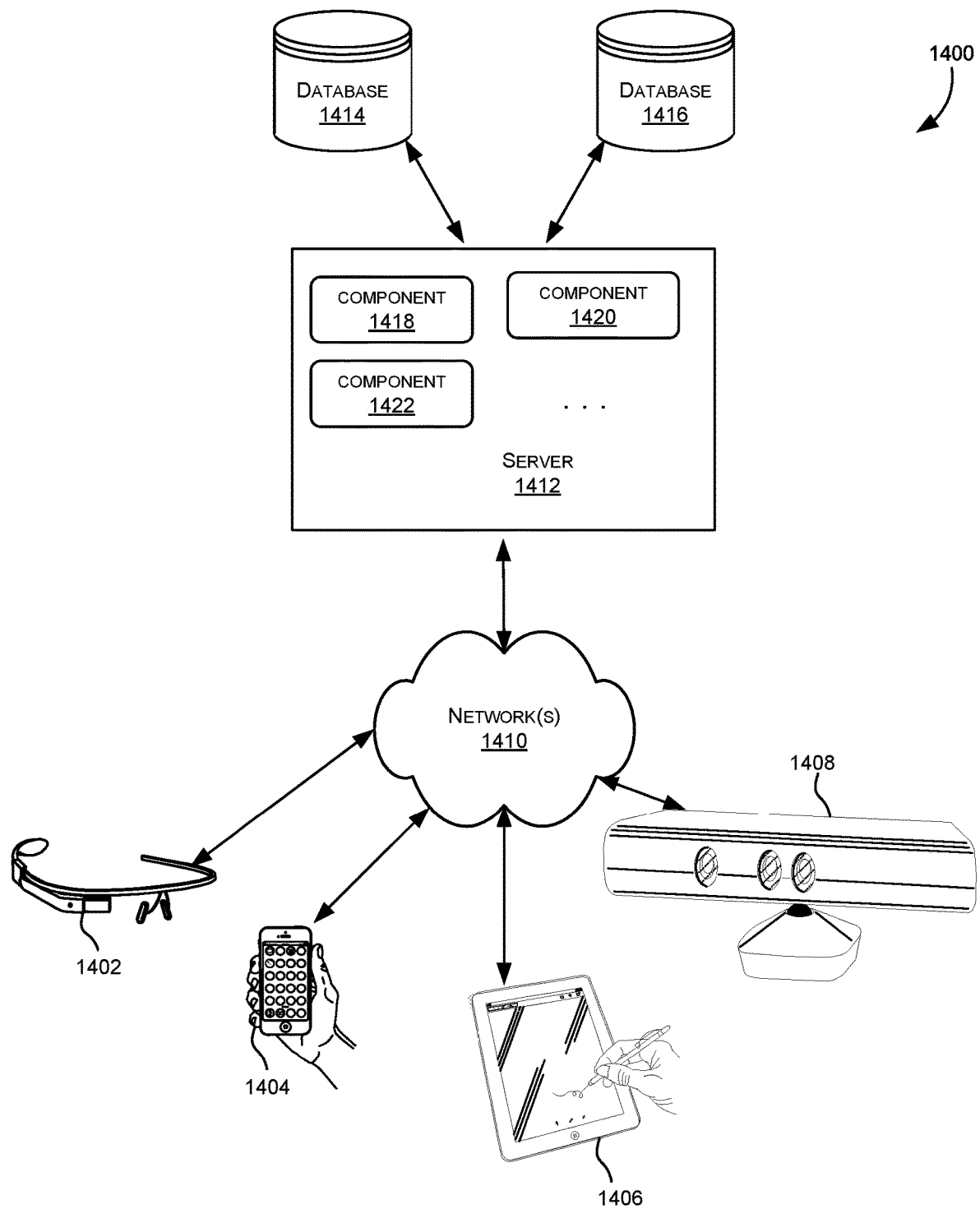
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
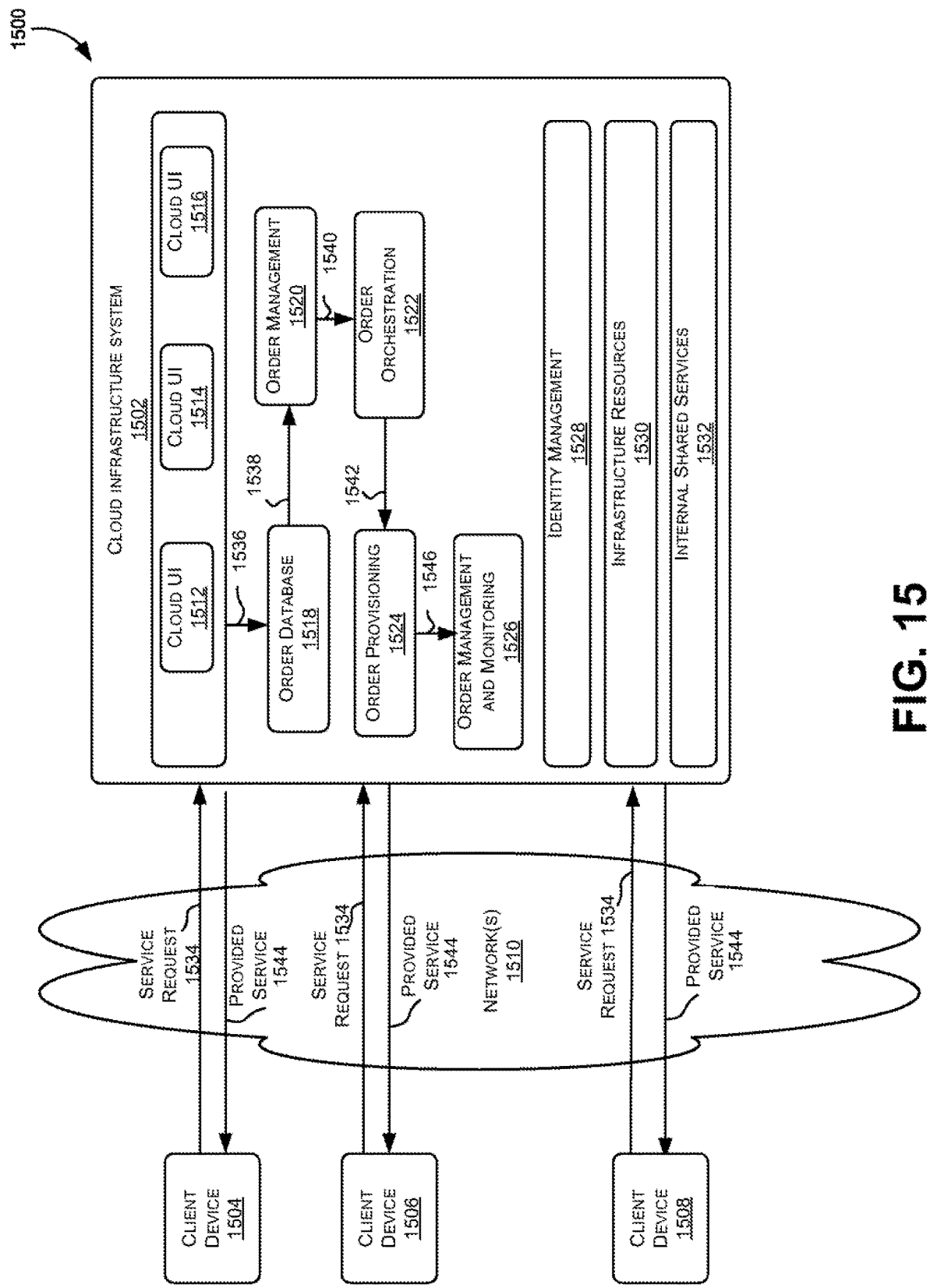
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
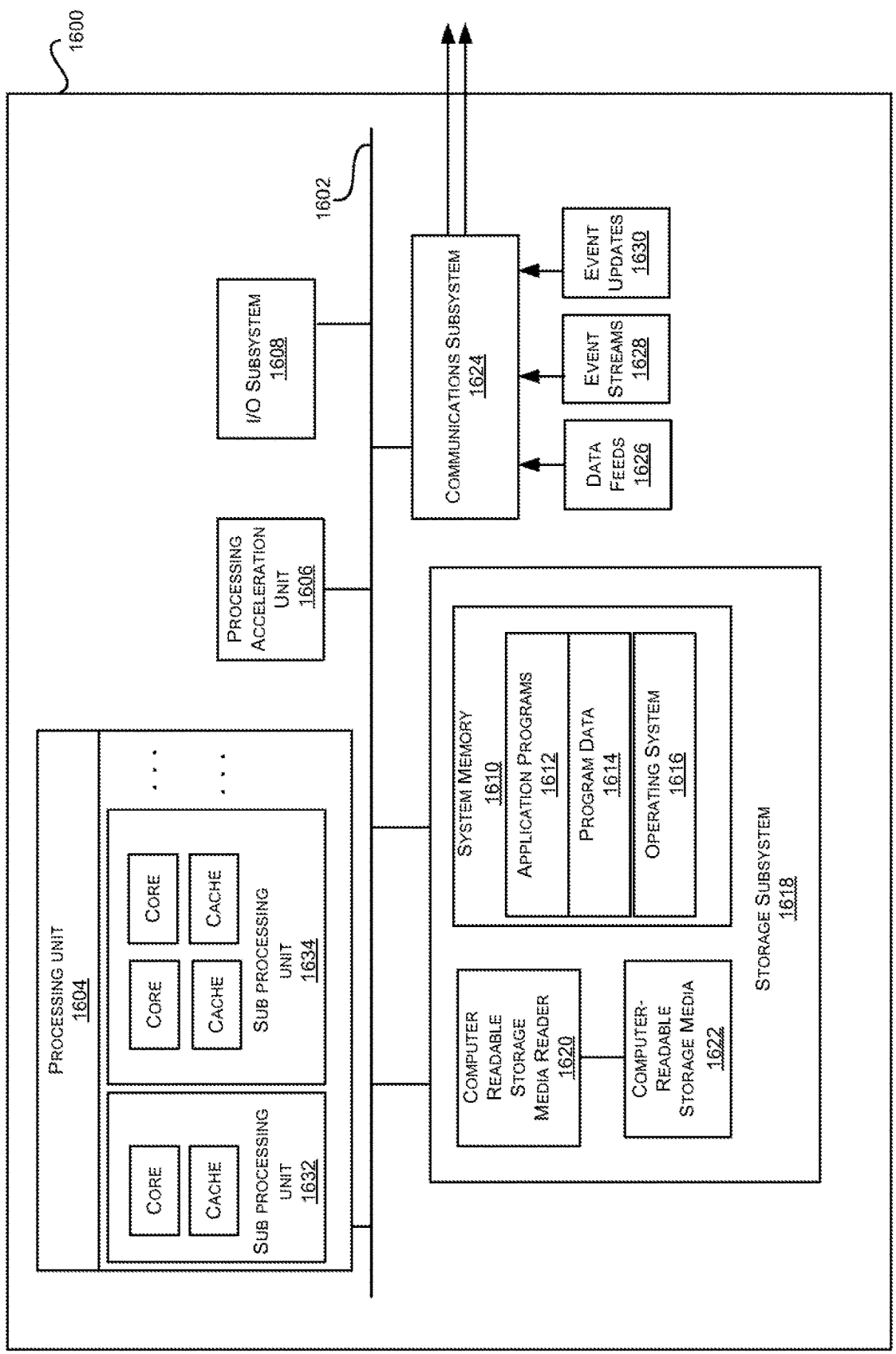
FIG. 16 illustrates an exemplary computer system, in which various embodiments may be implemented.

FIG. 16 illustrates an exemplary computer system 1600, in which various embodiments of the present invention may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present invention.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, causes the one or more processors to perform operations comprising:
   receiving a record to add to a blockchain, wherein the record comprises one or more private fields;
   encrypting the one or more private fields in the record using a first encryption key to provide a protected record;
   retrieving public keys for each of one or more authorized nodes;
   encrypting the first encryption key to provide an encrypted first encryption key using the public keys for each of the one or more authorized nodes;
   sending the protected record and the encrypted first encryption key to the one or more authorized nodes in a blockchain network, wherein the one or more authorized nodes are authorized to access the one or more private fields in the record and provide a consensus decision and each of the one or more authorized nodes receives a version of the encrypted first encryption key that was encrypted using the public key associated with the authorized node;
   receiving a consensus decision from the one or more authorized nodes in the blockchain network; and
   sending the protected record to the blockchain network to add to the blockchain.

2. The non-transitory computer-readable medium according to claim 1, wherein each of the one or more authorized nodes comprises a secure component that decrypts the one or more private fields to provide an unencrypted record for a consensus mechanism.

3. The non-transitory computer-readable medium according to claim 2, wherein the consensus mechanism comprises execution of a smart contract, and wherein the smart contract requires at least one of the one or more private fields to execute.

4. The non-transitory computer-readable medium according to claim 1, wherein the record further comprises one or more public fields.

5. The non-transitory computer-readable medium according to claim 4, wherein the one or more public fields are accessible to other nodes in the blockchain network that are not authorized to access the private fields in the protected record.

6. The non-transitory computer-readable medium according to claim 1, wherein the record is received by a first node in the blockchain network, and the first encryption key is specific to records received by the first node with private fields that are authorized to be accessed by the one or more authorized nodes.

7. The non-transitory computer-readable medium according to claim 6, wherein the operations further comprise:
   storing the first encryption key in a key-value store associated with the first node, wherein a key for the first encryption key comprises a hash of:
   an identifier for the first node; and
   a list of identifiers for the one or more authorized nodes.

8. The non-transitory computer-readable medium according to claim 7, wherein a value for the first encryption key comprises the first encryption key encrypted by a public key associated with the first node.

9. The non-transitory computer-readable medium according to claim 8, receiving a second record at the first node, wherein the second record comprises one or more second private fields that the one or more authorized nodes are allowed to access.

10. The non-transitory computer-readable medium according to claim 9, wherein the operations further comprise:
    providing the a hash of the identifier for the first node and the list of identifiers for the one or more authorized nodes to the key-value store;
    receiving the first encryption key encrypted by the public key associated with the first node from the key-value store;
    decrypting the first encryption key using a private key associated with the first node; and
    encrypting the one or more second private fields in the second record using the first encryption key to provide a second protected record.

11. The non-transitory computer-readable medium according to claim 1, wherein the operations further comprise:
    receiving a list identifying the one or more authorized nodes from a client application that sent the record to be added to the blockchain.

12. The non-transitory computer-readable medium according to claim 1, wherein the operations further comprise:
    generating key-value pairs for the one or more authorized nodes, where each of the key-value pairs comprises:
    a key comprising a hash of an identifier for the record and a public key associated with one of the one or more authorized nodes; and
    a value comprising the first encryption key encrypted using a public key of the one of the one or more authorized nodes; and
    sending the key-value pairs to the one or more authorized nodes for subsequent accesses of the protected record in the blockchain.

13. The non-transitory computer-readable medium according to claim 12, wherein each of the one or more authorized nodes stores its key-value pair in associated key-value stores.

14. The non-transitory computer-readable medium according to claim 13, wherein the operations further comprise:
    receiving, at an authorized node in the one or more authorized nodes, a request to access the protected record in the blockchain;
    retrieving the key-value pair from a key-value store associated with the authorized node; and
    decrypting the first encryption key using a private key associated with the authorized node;
    decrypting the private fields in the protected record; and
    providing the record to a requesting client application.

15. The non-transitory computer-readable medium according to claim 1, wherein the first encryption key comprises a symmetric encryption key.

16. A system comprising:
    one or more processors; and
    one or more memory devices comprising instructions that, when executed by the one or more processors, cause the one or more processors to perform operations comprising:
    receiving a record to add to a blockchain, wherein the record comprises one or more private fields;

encrypting the one or more private fields in the record using a first encryption key to provide a protected record;

retrieving public keys for each of one or more authorized nodes;

encrypting the first encryption key to provide an encrypted first encryption key using the public keys for each of the one or more authorized nodes;

sending the protected record and the encrypted first encryption key to the one or more authorized nodes in a blockchain network, wherein the one or more authorized nodes are authorized to access the one or more private fields in the record and provide a consensus decision and each of the one or more authorized nodes receives a version of the encrypted first encryption key that was encrypted using the public key associated with the authorized node;

receiving a consensus decision from the one or more authorized nodes in the blockchain network; and sending the protected record to the blockchain network to add to the blockchain.

17. A method for protecting private fields in a public record added to a blockchain, the method comprising:

receiving a record to add to a blockchain, wherein the record comprises one or more private fields;

encrypting the one or more private fields in the record using a first encryption key to provide a protected record;

retrieving public keys for each of one or more authorized nodes;

encrypting the first encryption key to provide an encrypted first encryption key using the public keys for each of the one or more authorized nodes;

sending the protected record and the encrypted first encryption key to the one or more authorized nodes in a blockchain network, wherein the one or more authorized nodes are authorized to access the one or more private fields in the record and provide a consensus decision and each of the one or more authorized nodes receives a version of the encrypted first encryption key that was encrypted using the public key associated with the authorized node;

receiving a consensus decision from the one or more authorized nodes in the blockchain network; and sending the protected record to the blockchain network to add to the blockchain.

\* \* \* \* \*

UNITED STATES PATENT AND TRADEMARK OFFICE
CERTIFICATE OF CORRECTION

| | |
|---|---|
| PATENT NO. | : 11,288,380 B2 |
| APPLICATION NO. | : 16/601205 |
| DATED | : March 29, 2022 |
| INVENTOR(S) | : Kumar et al. |

It is certified that error appears in the above-identified patent and that said Letters Patent is hereby corrected as shown below:

In the Specification

In Column 16, Line 17, delete "Internet" and insert -- Internetwork --, therefor.

In Column 24, Line 56, delete "evolution)," and insert -- evolution)), --, therefor.

In the Claims

In Column 28, Line 9, in Claim 10, delete "the a" and insert -- the --, therefor.

Signed and Sealed this
Sixth Day of September, 2022

Katherine Kelly Vidal
*Director of the United States Patent and Trademark Office*